United States Patent

[11] 3,607,810

[72] Inventors: Albert Schopf, Hering, Odenwald; Gerhard Meyer, Obernburg, Blumenstrasse, both of Germany
[21] Appl. No.: 727,374
[22] Filed: May 7, 1968
[45] Patented: Sept. 21, 1971
[73] Assignee: Glanzstaff AG, Wuppertal, Germany
[32] Priority: May 10, 1967
[33] Germany
[31] G 50052 IVc/39b

[54] AQUEOUS ALKALINE SOLUTIONS OF POLYHYDRAZIDES
10 Claims, No Drawings

[52] U.S. Cl. ............ 260/29.2 N, 260/47 CP, 260/78 TF, 264/184
[51] Int. Cl. ............ C08g 51/24, C08g 20/22, D01f 7/04
[50] Field of Search ............ 260/29.2 N

[56] References Cited
UNITED STATES PATENTS 3,130,182  4/1964  Frazer ............ 260/78
3,238,183  3/1966  Frazer ............ 260/78.4
3,476,719  11/1969  Frazer et al. ............ 260/78.4

OTHER REFERENCES

Fieser et al., Organic Chemistry 3rd Ed., Reinhold 1964 Pages 220–221, 274, 275

Astle et al., Organic Chemistry 2nd Ed., Harper Bros. 1959 Pages 236–237

Frazer et al., Journal of Polymer Science, Part A, Vol. 2, 1964, Pages 1149–1154

*Primary Examiner*—Julius Frome
*Assistant Examiner*—A. H. Koeckert
*Attorney*—Johnston, Root, O'Keeffe, Keil, Thompson & Shurtleff ABSTRACT: As a composition of matter, a dilute aqueous alkaline solution in which there is dissolved a polyhydrazide characterized by recurring polymeric units of the formula

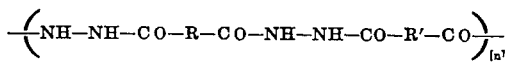

in which R and R' represent divalent aromatic or heterocyclic radicals such a phenylene, naphthalene or diphenylether and n is a large integer. This alkaline polymer solution can be used to form shaped products which in turn can be converted by heating into thermally-stable and insoluble polyoxadiazoles.

3,607,810

AQUEOUS ALKALINE SOLUTIONS OF POLYHYDRAZIDES

Polyhydrazides of the Formula I can be produced according to known processes by the reaction of dicarboxylic acid dihydrazides with dicarboxylic acid dichlorides. Polyhydrazides are especially interesting as prepolymers in the preparation of thermally stable polymer products when the groups R and R' in the above formula are divalent aromatic or heterocyclic radicals. These polyhydrazide prepolymers are converted into polymers containing oxadiazole rings by a simple heating step. The resulting polyoxadiazoles are products which are resistant to high temperatures and which are also practically insoluble. On account of their nonmeltability and their insolubility, the polyoxadiazoles containing the above-noted aromatic or heterocyclic radicals cannot be shaped or molded into useful articles.

It is known however that filaments, foils or similar shaped products can be obtained in the form of polyoxadiazoles provided that the preliminary product or prepolymer, i.e. the corresponding polyhydrazide, is first dissolved in an organic solvent, the resulting solution is then spun, cast, extruded or otherwise shaped in a conventional manner, and the shaped product thus formed is finally subjected to a cyclizing heat treatment. Dimethyl sulfoxide and dimethylacetamide are known as suitable organic solvents for such polyhydrazides. The use of organic solvents is relatively expensive, even where these solvents are recovered in the shaping process since the recovery steps represent a substantial additional cost.

It is the principal object of the present invention to provide novel polyhydrazide solutions which will avoid the high cost of using organic solvents. Another object of the invention is to provide novel polyhydrazide solutions as spinning, casting, extruding or coating compositions capable of being heated and converted after producing a shaped article into a thermally stable polyoxadiazole product.

In accordance with the invention, it has now been found that useful polyhydrazide spinning compositions or compositions useful in the production of polyoxadiazole filaments, films and the like are those which consist essentially of a dilute aqueous alkali metal hydroxide solution in which there is dissolved a polyhydrazide of the formula

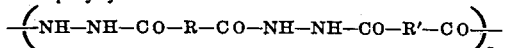

wherein R and R' represent a divalent aromatic or heterocyclic radical and $n$ is a large integer, and preferably in which R is a naphthalene or phenylene group and R' is a phenylene or diphenylether group.

Preferred polyhydrazides, for which the aqueous alkali hydroxide solutions of the invention are used as solvents, are the reaction products of isophthalic acid dihydrazide with the dichlorides of iso-or terephthalic acid, diphenylether dicarboxylic acid or 2,6-naphthalene dicarboxylic acid. In general, these polyhydrazides are known in the art, particularly those containing the above-noted aromatic or heterocyclic groups which lead to thermally stable polyoxadiazoles and which have the capacity of forming films, filaments or the like from an organic solvent. The initial dihydrazide and dichloride materials are usually reacted in about equimolar proportions and lead to relatively high molecular weight polyhydrazide prepolymers in which the recurring head-to-tail unit illustrated by Formula I contains the residue of one molecule of each of the initial reactants. The structure of these polyhydrazides as well as their preparation is thus quite well known, e.g. as disclosed in A. H. Frazer and F. T. Wallenberger, Journal of Polymer Science: Part A Vol. 2, PP. 1147–1156 (1964). By way of illustration, various combinations of the radicals R and R' in Formula I may be listed as follows:

| R | R' |
|---|---|
| 1,3-phenylene | 1,3-phenylene |
| 1,3-phenylene | 1,4-phenylene |
| 1,3-phenylene | p,p'-diphenylether |
| 2,6-naphthalene | 1,3-phenylene |

Table — Continued

| | |
|---|---|
| 1,4-naphthalene | 1,3-phenylene |
| 1,3-phenylene | p,p'-diphenylene |

The molecular weight of the polyhydrazide prepolymer can vary within a relatively broad range. For example, the reduced viscosity ($\eta_r$) of the prepolymer can be about 1,0 to 4, preferably 1,5 to 2,5, measured as 1 gram of the polymer dissolved in 200 ml. Dimethylsulfoxid at 20,0° C.

As solvents, dilute aqueous solutions of all alkali hydroxides can be used, although for economical reasons, sodium or potassium hydroxides are especially preferred. Solutions of mixtures of alkali hydroxides may also be used, if desired. It is generally essential to employ a dilute solution of the alkali metal hydroxide within a quite narrow range of alkaline concentration. Most suitable are aqueous sodium or potassium hydroxide solutions with a concentration of about 0.2 to 0.9 mol percent. In general, it has been found that one should work within a narrow range of alkali metal hydroxide concentration of about 0.1 to 1.0 mol percent (taken with reference to the water). However, in individual cases, it is often necessary to use much narrower ranges of concentration, particularly in order to achieve a polyhydrazide solubility of at least about 1 percent by weight, with reference to the aqueous alkaline solution.

The solubility of the polymer thus depends partly upon its constitution and partly upon the concentration and the cation of the alkali metal hydroxide solution. The optimum solvent capacity of the alkali hydroxide solution on the one hand and the maximum solubility of the individual polyhydrazide on the other hand can be readily determined by routine experimentation as can be seen from the representative examples set forth hereinafter. The presence of small amounts of other substances, e.g. other alkaline-reacting compounds or materials which are essentially inert or inactive in the solution, has no appreciable effect upon the solubility characteristics of the polymer in the solvent of the invention.

It can be assumed that the polyhydrazide goes into solution in its enol form:

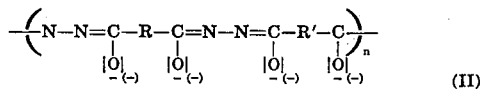

(II)

Thus, it is comprehensible that weakly enolized products, for example the polyhydrazide obtained in the reaction of isophthalic acid dihydrazide and 4,4-diphenylether-dicarboxylic acid dichloride, are only very slightly soluble in lithium and sodium hydroxide solutions, but at the same time, however, these weakly enolized products exhibit a good solubility in potassium hydroxide solutions.

In the following table are set forth data concerning the maximum concentration which can be achieved for a few polyhydrazides in aqueous sodium or potassium hydroxide solutions:

TABLE

| Polyhydrazide from | Concentration of aqueous alkali hydroxide solution in mol % | | Concentration of the polyhydrazide in % by weight | |
|---|---|---|---|---|
| | KOH | NaOH | KOH | NaOH |
| A. Isophthalic acid dihydrazide and terephthalic acid dichloride | 0.32 | 0.23 | 2.5 | 1.9 |
| B. Isophthalic acid dihydrazide and isophthalic acid dichloride | 0.65 | | 3.1 | |
| C. Isophthalic acid dihydrazide and diphenylether dicarboxylic acid dichloride. | 0.49 | | 3.5 | |
| D. Isophthalic acid | | | | |

Table—Continued

| | | | | |
|---|---|---|---|---|
| dihydrazide and 2,6-naphthalene-dicarboxylic acid dichloride | 0.49 | 0.45 | 4.4 | 5.0 |

The preferred KOH concentrations for individual polymers in the foregoing table are approximately as follows:

A=0.2 to 0.45 mol percent,
B=0.3 to 0.85 mol percent,
C=0.2 to 0.4 mol percent, and
D=0.2 to 0.6 mol percent.

In general, it is desirable to dissolve at least 1 percent by weight and preferably at least 2 percent by weight of the polymer in the dilute aqueous alkaline solution. The maximum amount of polymer which can be dissolved is of course most desirable and can be expected to range for example from about 2–10 percent by weight, usually about 2.5 to 5 percent by weight.

The solutions of polyhydrazides obtained according to the invention can be readily shaped or formed, e.g. by the usual spinning, casting or extrusion methods normally used with polymer solutions. The solidification of the spun or cast polymer from its solution in a suitable bath or the like can be readily accomplished, e.g. by using an aqueous bath containing a small amount of acid sufficient to neutralize the alkali of the polymer solution. This solidification can take place at about room temperature, e.g. 15–25° C., after which the shaped product is washed with water and preferably dried. After such shaping, for example after spinning the solution into filaments or a casting or the like into foils, films or coatings, the shaped product can be converted into the form of its insoluble and unmeltable polyoxadiazole. This conversion into the polyoxadiazole generally takes place by heating to a temperature about 180° C., preferably about 200° C. to 280° C.

The aqueous alkaline polymer solutions of the invention which contain only a small and critical amount of an alkali hydroxide are very simple and inexpensive in their preparation and use. The dilute alkali metal hydroxide solution as a solvent for the polyhydrazide prepolymer is thus quite advantageous in comparison to the considerably more expensive organic solvents which were previously believed to be the only solvents having any utility for spinning, casting, coating or otherwise shaping a polyhydrazide. There is no need to recover the aqueous alkaline solvent during or after the shaping process, whereas the elimination of this recovery step would be quite costly when using organic solvents. After solidifying the shaped prepolymer and converting it into the corresponding polyoxadiazole, the resulting product has essentially the same properties and utility as that obtained when working with an organic solvent.

The invention is hereby claimed as follows:

1. A composition consisting essentially of a dilute aqueous alkali metal hydroxide solution having a concentration of about 0.1 to 1.0 mol percent in which there is dissolved up to about 5 percent by weight of a resinous polyhydrazide having the repeating structure

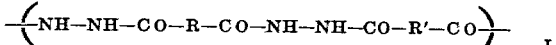

wherein R and R' represent a divalent carbocyclic aromatic radical.

2. A composition as claimed in claim 1 wherein R represents phenylene or naphthalene and R' represents phenylene or diphenylether.

3. A composition as claimed in claim 2 wherein the aqueous solution has an alkali metal hydroxide concentration of about 0.2 to 0.9 mol percent.

4. A composition as claimed in claim 3 wherein the alkali metal hydroxide is potassium hydroxide.

5. A composition as claimed in claim 3 wherein the alkali metal hydroxide is sodium hydroxide.

6. A composition as claimed in claim 3 wherein R of Formula I represents 2,6-naphthalene and R' of Formula I represents 1,3-phenylene, and the polyhydrazide is dissolved in an aqueous KOH solution having a KOH concentration of about 0.2 to 0.6 mol percent.

7. A composition as claimed in claim 3 wherein R of Formula I represents 2,6-naphthalene and R' of Formula I represents 1,3-phenylene, and the polyhydrazide is dissolved in an aqueous NaOH solution having a NaOH concentration of about 0.2 to 0.6 mol percent.

8. A composition as claimed in claim 3 wherein R of Formula I represents 1,3-phenylene and R' of Formula I represents p,p'-diphenylether, and the polyhydrazide is dissolved in an aqueous KOH solution having a KOH concentration of about 0.2 to 0.4 mol percent.

9. A composition as claimed in claim 3 wherein each of R and R' in Formula I represent 1,3-phenylene, and the polyhydrazide is dissolved in an aqueous KOH solution having a KOH concentration of about 0.3 to 0.85 mol percent.

10. A composition as claimed in claim 3 wherein R in Formula I represents 1,4-phenylene and R' in Formula I represents 1,3-phenylene, and the polyhydrazide is dissolved in an aqueous KOH solution having a KOH concentration of about 0.2 to 0.45 mol percent.